US009266540B2

(12) United States Patent
Mair et al.

(10) Patent No.: US 9,266,540 B2
(45) Date of Patent: Feb. 23, 2016

(54) SWINGING-SLIDING DOOR MODULE FOR A RAIL VEHICLE (71) Applicant: KNORR-BREMSE GESELLSCHAFT MIT BESCHRÄNKTER HAFTUNG, Mödling (AT)

(72) Inventors: Andreas Mair, Oberschlierbach (AT); Heinz Zarl, Zeilem (AT)

(73) Assignee: KNORR-BREMSE SYSTEME FUR SCHIENENFAHRZEUGE GMBH, Moedling (DE)

( * ) Notice: Subject to any disclaimer, the term of this patent is extended or adjusted under 35 U.S.C. 154(b) by 0 days.

(21) Appl. No.: 14/423,457

(22) PCT Filed: Aug. 9, 2013

(86) PCT No.: PCT/AT2013/050157
§ 371 (c)(1),
(2) Date: Feb. 24, 2015

(87) PCT Pub. No.: WO2014/032068
PCT Pub. Date: Mar. 6, 2014

(65) Prior Publication Data
US 2015/0217785 A1  Aug. 6, 2015

(30) Foreign Application Priority Data

Aug. 27, 2012  (AT) ............... GM 344/2012
Jun. 27, 2013  (AT) ............ GM 50095/2013

(51) Int. Cl.
*B61D 19/00* (2006.01)
*E05D 15/48* (2006.01)
(Continued)

(52) U.S. Cl.
CPC .............. *B61D 19/008* (2013.01); *E05D 15/48* (2013.01); *E06B 3/50* (2013.01); *E06B 3/5072* (2013.01); *E05D 2015/485* (2013.01); *F16C 29/008* (2013.01); *F16C 29/0633* (2013.01)

(58) Field of Classification Search
CPC ....... E06B 3/50; E06B 3/5072; B61D 19/008; E05D 15/48; E05D 2015/485
See application file for complete search history.

(56) References Cited

U.S. PATENT DOCUMENTS 2,774,998 A * 12/1956 Kiekert .......................... 49/217
4,503,637 A *  3/1985 Parente .......................... 49/141
(Continued)

FOREIGN PATENT DOCUMENTS

DE          2052764 A1   5/1972
DE         29819076 U1   2/1999
(Continued)

OTHER PUBLICATIONS

Search Report for Austrian Patent Application No. GM 344/2012; Jun. 26, 2013.
(Continued)

*Primary Examiner* — Katherine Mitchell
*Assistant Examiner* — Abe Massad
(74) *Attorney, Agent, or Firm* — Barnes & Thornburg LLP (57) ABSTRACT A swinging-sliding door module for a rail vehicle having at least one swinging-sliding door and a linear guide with a profile rail oriented in the sliding direction of the swinging-sliding door, and a carriage mounted displaceably on the profile rail. The swinging-sliding door module includes a bracket or a plurality of brackets for fastening the swinging-sliding door, which bracket or brackets is/are connected to the at least one carriage or is/are surrounded by the latter. The swinging-sliding door module also has at least one rotary joint which permits rotation of the swinging-sliding door in relation to the profile rail about an axis of rotation oriented substantially horizontally and transversely with respect to the sliding direction and/or about an axis of rotation oriented substantially vertically. Also disclosed is a rail vehicle with a swinging-sliding door module.

13 Claims, 9 Drawing Sheets (51) Int. Cl.
*E06B 3/50* (2006.01)
*F16C 29/06* (2006.01)
*F16C 29/00* (2006.01)

(56) References Cited

U.S. PATENT DOCUMENTS

| | | | |
|---|---|---|---|
| 4,669,220 A * | 6/1987 | Dilcher | 49/219 |
| 5,438,800 A | 8/1995 | Porter | |
| 7,426,803 B2 * | 9/2008 | Fronz et al. | 49/209 |
| 7,484,331 B2 * | 2/2009 | El Jalkh | 49/260 |
| 2002/0194783 A1 | 12/2002 | Stojc et al. | |
| 2011/0146161 A1 * | 6/2011 | Heuel et al. | 49/414 |

FOREIGN PATENT DOCUMENTS

| | | |
|---|---|---|
| DE | 202006015735 U1 | 2/2008 |
| DE | 102008000867 A1 | 10/2008 |
| EP | 0788960 A1 | 8/1997 |
| EP | 1314626 A1 | 5/2003 |
| WO | 2010108664 A1 | 9/2010 |
| WO | 2011129918 A2 | 10/2011 |

OTHER PUBLICATIONS

Search Report for Austrian Patent Application No. GM 50095/2013; Mar. 13, 2014.
Search Report for International Patent Application No. PCT/AT2013/050157; Feb. 11, 2014.
English Translation of Written Opinion of the International Search Authority for International Patent Application No. PCT/AT2013/050157 dated Sep. 8, 2013 and International Search Report.

* cited by examiner

SWINGING-SLIDING DOOR MODULE FOR A RAIL VEHICLE

PRIORITY CLAIM

This patent application is a U.S. National Phase of International Patent Application No. PCT/AT2013/050157, filed 9 Aug. 2013, which claims priority to Austrian Patent Application Nos. GM 344/2012, filed 27 Aug. 2012, and GM 50095/2013, filed 27 Jun. 2013, the disclosures of which are incorporated herein by reference in their entirety.

FIELD

Disclosed embodiments relate to a swinging-sliding door module for a rail vehicle, comprising at least one swinging-sliding door and a linear guide with a profile rail oriented in the sliding direction with the swinging-sliding door and a slide which is mounted displaceably on the profile rail. In addition, the swinging-sliding door module comprises a bracket or a plurality of brackets with fastening means for fastening the swinging-sliding door, which bracket or brackets is/are connected to, or surrounded by, the at least one slide. Disclosed embodiments also relate to a rail vehicle which comprises at least one swinging-sliding door module of the type mentioned.

Disclosed embodiments provide an improved swinging-sliding door module. In particular, the service life of the bearing between slide and profile rail is intended to be extended and/or the weight of the swinging-sliding door module is intended to be reduced.

Disclosed embodiments provide a swinging-sliding door module comprising at least one rotary joint which permits rotation of the swinging-sliding door in relation to the profile rail about an axis of rotation oriented substantially horizontally and transversely with respect to the sliding direction and/or an axis of rotation oriented substantially vertically.

Disclosed embodiments provide a rail vehicle which comprises at least one swinging-sliding door module.

BRIEF DESCRIPTION OF THE FIGURES

For better understanding, the disclosed embodiments are explained in more detail with reference to the figures below in which.

DETAILED DESCRIPTION OF THE DISCLOSED EMBODIMENTS

In at least one disclosed embodiment, the swinging-sliding door module comprises two generally cylindrical rolling surfaces with axes lying transversely on each other. Rotation about two axes of rotation is thereby permitted. Such a rotary joint can therefore particularly readily compensate for deformation of a profile rail. In addition, comparatively high forces can again be transmitted because of the linear contact between the rolling surfaces.

One rolling surface may be curved multi-dimensionally, in particular spherical. Rotation about a plurality of axes of rotation is thereby likewise permitted. Such a rotary joint can therefore likewise particularly readily compensate for deformation of a profile rail. The multi-dimensional curvature enables the rolling surfaces to roll on each other during rotation about any axis, as a result of which sliding on each other is avoided and wear of the rolling surfaces is therefore reduced.

The weight of the swinging-sliding door may press the two rolling surfaces against each other. Since the two rolling surfaces are then pressed against each other without further measures, the swinging-sliding door module can be designed to be relatively simple in terms of structure in this case, thus resulting in a further weight and price advantage.

The linear guide may be a linear rolling guide, and the slide may be a guide carriage which is mounted on the profile rail by means of revolving rolling bodies. As a result, the swinging-sliding door runs smoothly and without play on the profile rail. In particular if the profile rail has a circular cross section, a rotary joint permitting rotation of the swinging-sliding door in relation to the profile rail about an axis of rotation oriented substantially parallel to the sliding direction can be omitted. If, for example, a substantially rectangular profile rail is used, a torque can then be transmitted between the swinging-sliding door and the profile rail about the axis of rotation mentioned.

Linear rolling guides of the type mentioned are rolling guides which can be formed with balls or rollers as the rolling bodies. The rolling bodies form the binding element between profile rail and guide carriage in a contact region. The rolling bodies not in contact with the profile rail at a particular instant are conducted via a return region (for example return channel) from the end of the contact region to the beginning thereof, or vice versa. The rolling bodies therefore move in a closed track. The track is generally arranged substantially in a plane, the "revolving plane". It is possible here for one oval track to be provided, or a plurality of oval or circular tracks can be provided one behind another, the tracks being arranged in the same plane and, in the entirety thereof, forming a contact region. Furthermore, a plurality of tracks can also be arranged in planes which differ, but are parallel to one another. Finally, the tracks can also intersect one another. For example, a revolving track can leave the revolving plane in the reversing region to permit an intersection with another revolving track. Within the context of the disclosed embodiments, such revolving tracks should nevertheless, however, be regarded as "arranged substantially in one plane". The rolling bodies can optionally also be arranged in a rolling body cage.

A convex rolling surface arranged on the bracket is pressed by the weight of the swinging-sliding door onto a horizontally oriented, flat rolling surface of the slide. A particularly simple and cost-effective construction thereby results, in particular if the linear guide is designed as a linear rolling guide. The guide carriage is mainly generally composed of high-strength and hardened steel and is ground on the upper side. The upper side of a commercially available guide carriage can thereby act without further measures as a rolling surface. On the bracket side, only a convex rolling surface therefore needs to be provided to realize a rotary joint.

Two rolling surfaces rolling on each other may be secured against lifting with the aid of a counterholder. This avoids the rolling surfaces being able to (decisively) lift from each other. In particular in the case of heavy swinging-sliding doors, damage to the rolling surface, which damage may result by the rolling surfaces striking against each other, can therefore be avoided or at least reduced. Without further measures, it is possible, for example, for vertical impacts against the rail vehicle to cause the swinging-sliding door to lift out and to subsequently strike against the bearing surface and to destroy same. In particular in the case of hardened surfaces, parts of the bearing surface could chip off.

The counterholder may press the rolling surfaces against each other with the aid of spring force and/or by elastic deformation. The effect achieved by this is that, when the rolling surfaces roll on each other, the counterholder moves in relation to the held rolling surface, in particular can rotate in relation thereto, and rolling of the rolling surfaces on each other counter to moderate resistance is possible. All types of springs and elastic components (for example rubber buffers) can be used. As an alternative or in addition thereto, the counterholder can also be designed in such a manner that it provides only moderate resistance by means of elastic deformation to the rolling of the rolling surfaces on each other.

In addition, the profile rail may be fastened on, or be surrounded by, a support which is oriented in the sliding direction of the swinging-sliding door, wherein the contact surface of the profile rail is oriented substantially horizontally with the support (in the unloaded state of same).

In conventional guide systems, the contact surface of the profile rail with the support is oriented substantially vertically, as a result of which the mounting surface of the guide carriage is also oriented vertically. In particular if the mounting surface faces outward, the profile rail and the swinging-sliding door or a bracket for fastening the swinging-sliding door can be conveniently mounted.

Despite the mentioned end-side mounting of the swinging-sliding door or of the bracket on the guide carriage, the installation height of the guide system mentioned is comparatively large in total. In particular in the case of use in double-deck cars and also if a plurality of profile rails for guiding the two door leaves of a double-wing swinging-sliding door are arranged one above another, limitations in respect of the remaining clearance height arise since the overall height of the cars cannot be increased as desired.

By means of the special orientation of the profile rail, the latter now projects over the support in the mounting region of the profile rail in a substantially vertical direction. This makes it possible to obtain an increased entry height without the entire overall height of the swinging-sliding door module having to be increased for this purpose. This results in a significant improvement of the entry situation especially in the case of very low rail vehicles or in the case of double-deck cars.

In particular if the contact surfaces are not flat, there is a substantially horizontal orientation of same whenever a resulting supporting force acts in the substantially vertical direction between profile rail and support. Contact surfaces which are not flat can be in the shape, for example, of a cylinder segment, for example if the profile rail has a circular cross section.

An imaginary connecting line between two rolling bodies may make contact with the profile rail and lie opposite each other with respect to an axis through the center of gravity of the profile cross section, which axis is directed normally to the mounting surface, is oriented substantially horizontally. This firstly achieves a low overall height of the guide system and, secondly, horizontally acting forces can be very readily absorbed. The forces can be caused, for example, by pressure fluctuations which arise when two trains encounter each other or upon entry into and exit from a tunnel. Enormous forces arise, in particular in high speed trains, because of the relatively large surfaces of the swinging-sliding doors.

At least one revolving plane of the rolling bodies may be oriented substantially horizontally. This achieves a particularly low construction of the guide system. It is also conceivable for one of two revolving planes arranged one above the other to be oriented substantially horizontally and for the other to be oriented obliquely with respect thereto, in particular substantially vertically with respect thereto.

The support may be higher in cross section on both sides of the profile rail than in the region of the profile rail. In particular, for this purpose, the support has an elevation in the cross section on the upper and lower side thereof to the side of the profile rail. Specifically, the support can also have a substantially I-shaped or X-shaped or T-shaped cross section.

As a result, firstly the vertical flexural rigidity of the support and, secondly, also the horizontal flexural rigidity of the support can be increased. The weight of the swinging-sliding door fastened to the guide system and vertical impacts/accelerations therefore cause only a comparatively small deflection of the support in the vertical direction. A horizontal force component on the swinging-sliding door, such as arise in particular because of the suction and pressure actions occurring in tunnels, therefore causes a likewise comparatively small deflection of the support in the horizontal direction. Furthermore, a torsional tendency of the support is also reduced. The support can therefore be designed overall to have relatively thin walls, as a result of which the overall weight of the rail vehicle is reduced and the driving performance thereof improved. The small deformation of the support also reduces the loading of the guide system, thus resulting in a longer service life and also longer maintenance intervals of same.

At this juncture, it is noted that the support may be oriented substantially vertically.

The guide system may comprise two linear guides, wherein a first profile rail is mounted on the upper side of the support and a second profile rail is mounted on the lower side of the support. A single support can thereby be used for holding a double-wing swinging-sliding door. Accordingly, a swinging-sliding door module comprises a first swinging-sliding door which is fastened to the bracket or to the brackets of the lower linear guide, and a second swinging-sliding door which is fastened to the bracket or to the brackets of the upper linear guide.

The advantage of the low overall height of the guide system is particularly clear here. In particular, it is also of advantage if the support is constructed symmetrically with respect to the horizontal axis thereof, since a particular mounting direction then does not need to be taken into consideration.

The brackets of the lower and upper linear guide may be of substantially identical design and may be rotated through 180° about a horizontal axis oriented normally to the profile rail. As a result, the number of different components of the guide system is reduced and therefore the production and stock-keeping are simplified.

The fastening means may be arranged at substantially the same height on the brackets of the lower and upper linear guide. As a result, it is possible to construct even the door wings in a similar or even identical manner. The production of a swinging-sliding door module and the stock-keeping of the parts required for the production or repair thereof are therefore also further simplified.

The profile rail may have a substantially C-shaped or U-shaped cross section and the guide carriage is mounted between the opposite end limbs of the C-shaped or U-shaped cross section. As a result, the rolling planes/contact regions move comparatively far outward, which has a positive effect on the stability of the linear rolling guide. A significantly narrower linear rolling guide than is possible in the prior art can therefore be used with the stability being identical. As a result, the overall depth of the guide system for the swinging-sliding door can also be significantly reduced.

The rolling bodies may be arranged in a single row between an end limb of the profile rail and the guide carriage. The linear guide is thereby particularly tolerant in relation to deformation of the guide system and is therefore particularly readily suitable for use in rail vehicles. For the reasons mentioned, the linear guide also has a very long service life.

The rolling bodies may be arranged in a plurality of rows, in particular in two rows, between an end limb of the profile rail and the guide carriage. As a result, the profile rail is particularly resistant in relation to distortion about the longitudinal axis thereof.

Finally, two spaced-apart guide carriages may be arranged at the ends of a bracket or of a bracket region. In particular, the two guide carriages may be in total at maximum half the length of the bracket or of the bracket region. The mounting of the guide carriages thereby remains smooth-running even if the support or the profile rail is deflected to a comparatively great degree.

It should be stated at the onset that identical parts are provided with the same reference numbers or same component designations in the variously described embodiments, wherein the disclosures contained throughout the description can be transferred analogously to identical parts with the same reference numbers or identical component designations. The position details selected in the description, such as, for example, at the top, at the bottom, laterally, etc. also relate to the immediately described and illustrated figure and, in the event of a change in position, can be transferred analogously to the new position. Furthermore, individual features or combinations of features from the various exemplary embodiments shown and described can constitute solutions which are independent, inventive or are according to the disclosed embodiments per se.

All of the details regarding the value ranges in the objective description should be understood to the effect that the details comprise any and all subdomains thereof, for example the detail 1 to 10 should be understood as meaning that all subdomains starting from the lower limit 1 and the upper limit 10 are covered, that is to say, all subdomains begin with a lower limit of 1 or more and end at an upper limit of 10 or less, for example 1 to 1.7, or 3.2 to 8.1 or 5.5 to 10.

Figure 1:
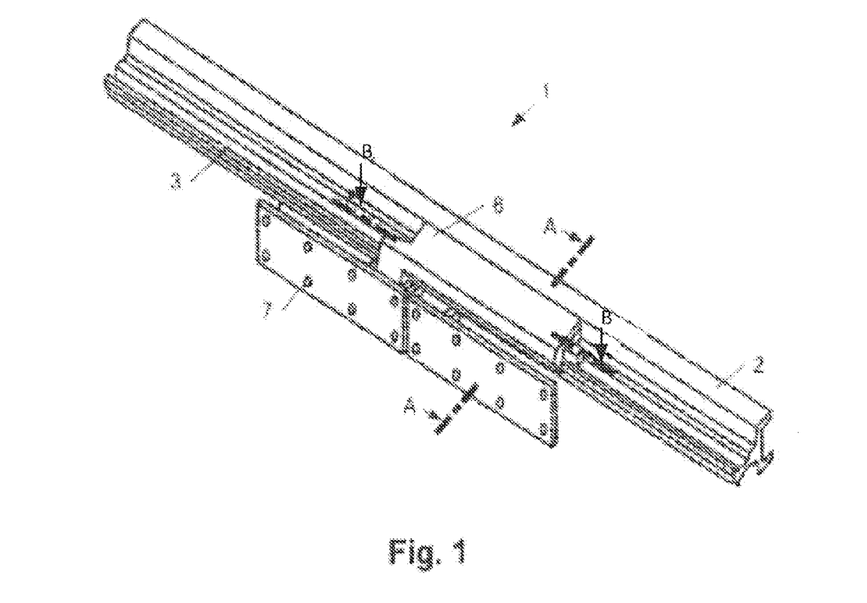
FIG. 1 shows a schematically illustrated guide system for a swinging-sliding door of a rail vehicle in oblique view.
Figure 2:
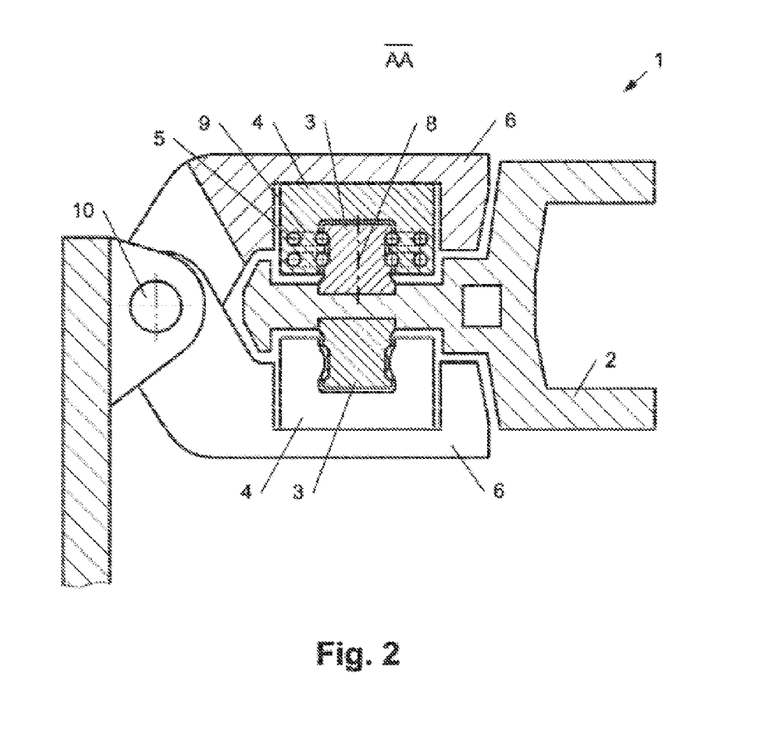
FIG. 2 shows the guide system of FIG. 1 in cross section.

FIGS. 1 and 2 show an exemplary and schematically illustrated guide system 1 for a swinging-sliding door of a rail vehicle in an oblique view (FIG. 1) and in section (FIG. 2). The guide system 1 comprises a support 2 oriented in the sliding direction of the swinging-sliding door, and a linear rolling guide with two profile rails 3 and two guide carriages 4, wherein the profile rail 3 is fastened on the support 2 (for example is screwed thereto) or is surrounded by the latter, and the at least one guide carriage 4 is mounted on the profile rail 3 by means of revolving rolling bodies 5. Furthermore, the guide system comprises a plurality of brackets 6 with fastening means 7 (fastening holes here) for fastening two swinging-sliding doors (not illustrated), wherein the brackets 6 are connected to, or are surrounded by, the at least one guide carriage 4. In this example, the contact surface of a profile rail 3 with the support 2 is oriented substantially horizontally. In FIG. 1, the profile rail 3 does not extend over the entire length of the support 2. Of course, however, this may be the case.

The support 2 can be connected fixedly to the rail vehicle or else can also be movable. The support 2 is extended here transversely with respect to the sliding direction of the swinging-sliding doors such that the swinging-sliding doors can be moved. In particular in the case of such a construction, a low weight of the entire arrangement should be respected since the weight subjects the guide system of the support 2 (not illustrated) to a comparatively heavy load.

It can readily be seen in FIG. 1 that, in this example, the guide system 1 has two linear guides, wherein a first profile rail 3 is mounted on the upper side of the support 2 and a second profile rail 3 is mounted on the lower side of the support 2. A single support 2 can thereby be used for holding a double-wing swinging-sliding door. The advantage of the low overall height of the guide system is particularly clear here. In particular, it is also of advantage if the support 2 is constructed symmetrically with respect to the horizontal plane since a particular mounting direction does not then have to be taken into consideration.

It can also be readily seen in FIG. 1 that, in this example, the brackets 6 of the lower and upper linear guide are designed substantially identically and are rotated through 180° about a horizontal axis oriented normally to the profile rail 3. As a result, the number of different components of the guide system 1 is reduced and therefore the production and stock-keeping are simplified.

Finally, it can also be readily seen in FIG. 1 that, in this example, the fastening means 7 on the brackets 6 of the lower and upper linear guide are arranged on substantially the same level. As a result, it is possible also to construct the door wings in a similar or even identical manner. The production of a swinging-sliding door module and the stock-keeping of the parts required for the production or repair thereof are therefore also further simplified.

As is readily apparent in particular from FIG. 2, in this example, the profile rails 3 project over the support 2 in the vertical direction in the mounting region of the profile rails 3. An enlarged entry height/clearance height can thereby be obtained without the entire overall height of the swinging-sliding door module 1 having to be increased for this purpose (also compare FIG. 9 in this regard).

It is furthermore apparent from FIG. 2 that, in this disclosed embodiment, an imaginary connecting line between two rolling bodies 5 which contact the profile rail 3 and are opposite each other with respect to an axis through the center of gravity 8 of the profile cross section, which axis is oriented normally to the mounting surface, is oriented substantially horizontally. Furthermore, a revolving plane of the rolling bodies 5 is oriented substantially horizontally.

Figure 3:
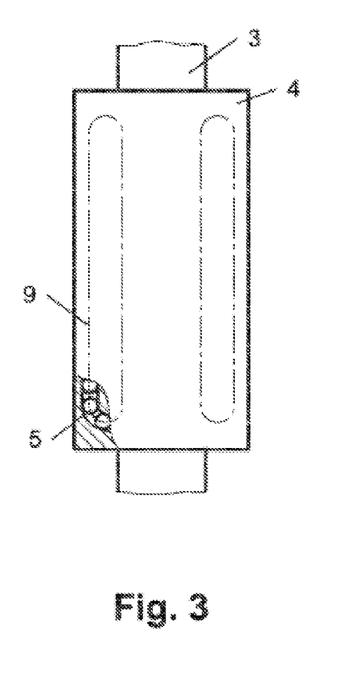
FIG. 3 shows a linear rolling guide with oval revolving tracks for the rolling body.
Figure 4:
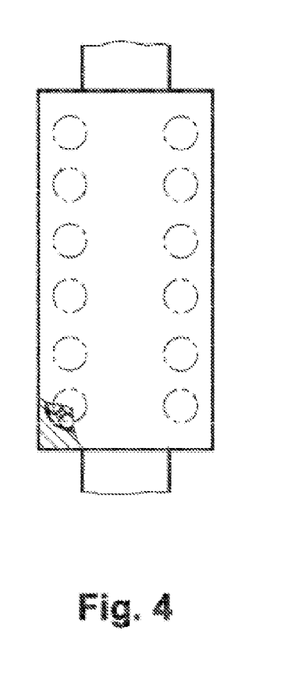
FIG. 4 shows a linear rolling guide with circular revolving tracks for the rolling body.

FIGS. 3 and 4 show in this regard two examples of revolving tracks 9 of the rolling bodies 5 in the guide carriage 4. In FIG. 3, the rolling bodies 5 revolve along oval revolving tracks 9, and in FIG. 4 along circular revolving tracks 9. In the variant of the guide system 1 that is presented, the revolving tracks 9 lie in a horizontal plane. By means of the measures mentioned, firstly a particularly low overall height of the guide system 1 is achieved and, secondly, horizontally acting forces which can be caused, for example, by pressure fluctuations acting on the swinging-sliding door can be very readily absorbed. In general, the revolving planes of the rolling bodies 5 can also be inclined somewhat in relation to the horizontal without the overall height of the guide system excessively increasing as a result. It has proven advantageous if a revolving plane is inclined by not more than 20° in relation to the horizontal.

Furthermore, it is apparent from FIG. 2 that, in the example illustrated, the support 2 in cross section on both sides of the profile rails 3 is higher than in the region of the profile rail 3. For this purpose, the support 2 has an elevation in the cross section on the upper and lower side thereof to the side of the profile rails 3. In this example, the support 2 therefore has a substantially I-shaped or X-shaped or T-shaped cross section. As a result, firstly the vertical flexural rigidity of the support 2 and, secondly, also the horizontal flexural rigidity of the support 2 can be significantly increased. Forces both in the horizontal and in the vertical direction therefore cause only a comparatively small deflection of the support 2. By means of the comparatively high torsional moment of inertia, distortion of the support 2 also remains small. At this juncture, it is noted that the features mentioned can also be of advantage whenever the revolving plane of the rolling bodies is oriented vertically (compare FIG. 9 in this regard).

Finally, a rotary joint can readily be seen in FIG. 2, which rotary joint, in this example, permits rotation of the swinging-sliding door in relation to the profile rail 3 about an axis of rotation oriented substantially parallel to the sliding direction. As a result, firstly, twisting of the profile rail can be compensated for, and, secondly, it is also possible to adapt the guide system 1 in a simple manner to different installation situations. In particular, modern rail vehicles do not inevitably have vertically running side walls, but rather taper upward. As a result, the swinging-sliding door is somewhat oblique in relation to the guide system 1. However, with the aid of the rotary joint, the guide system 1 illustrated can also be used without limitation in such cases. In this case, the rotary joint is formed by a pin 10 rotating in a bearing shell, but, of course, the use of a rolling bearing is also conceivable. It would also be possible to form the joint from a ball head mounted in a ball socket such that rotations about a plurality of axes are possible. A cardanic joint could therefore be provided.

The permitting of rotation about the longitudinal axis is in no way the sole possibility of permitting distortion between swinging-sliding door and profile rail 3. It is also conceivable that the guide system comprises at least one rotary joint which peimits rotation of the swinging-sliding door in relation to the profile rail 3 about an axis of rotation oriented substantially horizontally and transversely with respect to the sliding direction and/or about a substantially vertically oriented axis of rotation.

Figure 5:
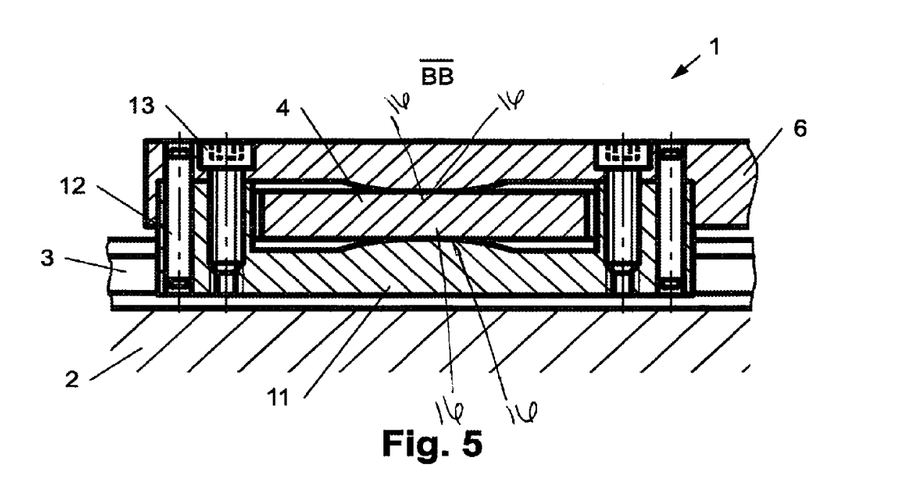
FIG. 5 shows the guide system from FIG. 1 in longitudinal section.
Figure 6:
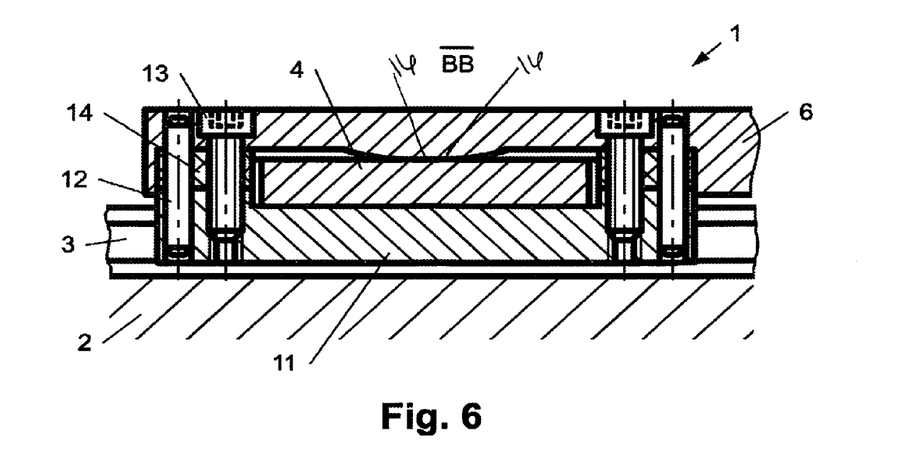
FIG. 6 is as FIG. 5, only with an elastic element between bracket and counterholder.

To this end, FIGS. 5 and 6 show two illustrative examples of how rotation of the swinging-sliding door about an axis of rotation oriented substantially horizontally and transversely with respect to the sliding direction is made possible.

FIG. 5 shows a section BB from which it is apparent that the bracket 6 in the region of the guide carriage 4 has a convex section which rests on the flat surface of the guide carriage 4, as a result of which a rotary joint having two rolling surfaces rolling on each other is formed. Owing to the fact that the guide carriage 4 is generally composed of high-strength and hardened steel, the upper side of a commercially available guide carriage can act as a rolling surface without further measures.

Specifically, the rolling surface arranged on the bracket 6 has a cylindrical shape, wherein the projections are normal to the plane of the sheet. The bracket 6 and therefore a swinging-sliding door fastened thereto can therefore be rotated in relation to the profile rail 3 about an axis of rotation oriented substantially horizontally and transversely with respect to the sliding direction, as a result of which vertical deflections of the profile rail 3 can be compensated for.

In this example, the two rolling surfaces are pressed against each other by a weight of the swinging-sliding door. In addition, the two rolling surfaces rolling on each other are secured against lifting with the aid of an optional counterholder 11. The counterholder 11 is positionally fixed in relation to the bracket 6 with the aid of alignment pins 12 and is screwed to the bracket with the aid of the screws 13. To permit rotation of the bracket 6 in relation to the profile rail 3, as illustrated in FIG. 5, the counterholder 11 can also be shaped convexly and/or a small amount of play can be permitted. In the latter case, lifting of the upper rolling surfaces is therefore possible in principle, but the "dropping height" (i.e. the play) is selected to be so small that damage to the rolling surfaces when the bracket 6 strikes against the guide carriage 4 can be avoided.

FIG. 6 shows a variant of the guide system which is very similar to the variant illustrated in FIG. 5. In contrast thereto, the optional counterholder 11 presses the rolling surfaces 16 against each other with the aid of a spring force and/or by means of elastic deformation. Specifically, the bracket 6 is screwed for this purpose to the counterholder 11 via two rubber buffers 14 which permit the rolling surfaces 16 to roll on each other with a moderate application of force, but prevent or at least make it difficult for the rolling surfaces 16 to lift. In the exemplary embodiment illustrated in FIG. 6, the counterholder 11 does not have a convex region, but it is, of course, also conceivable for the counterholder to be shaped such as illustrated in FIG. 5, as a result of which rolling of the rolling surfaces 16 on each other is facilitated.

In principle, it is sufficient for the arrangement illustrated in FIG. 6 if the bracket 6 can move in a translatory manner in relation to the counterholder 11. However, in a variant of the arrangement illustrated in FIG. 6, the fitting of the alignment pin 12 can also be selected to be relatively loose, or the alignment pin can be mounted in a rubber sleeve, and therefore tilting of the bracket 6 and of the counterholder 11 in relation to each other is possible. Given a correspondingly loose fit, the counterholder 11 here can even also remain resting flat on the guide carriage 4 when the bracket 6 is tilted or rotated in relation to the guide carriage 4.

Although the joints illustrated in FIGS. 5 and 6 permit a rotation of the bracket 6 in relation to the profile rail 3 about an axis of rotation oriented substantially horizontally and transversely with respect to the sliding direction, the joints illustrated can also be provided, by means of a corresponding arrangement, for rotation about a vertical axis of rotation or about an axis of rotation oriented substantially parallel to the sliding direction.

Figure 7:
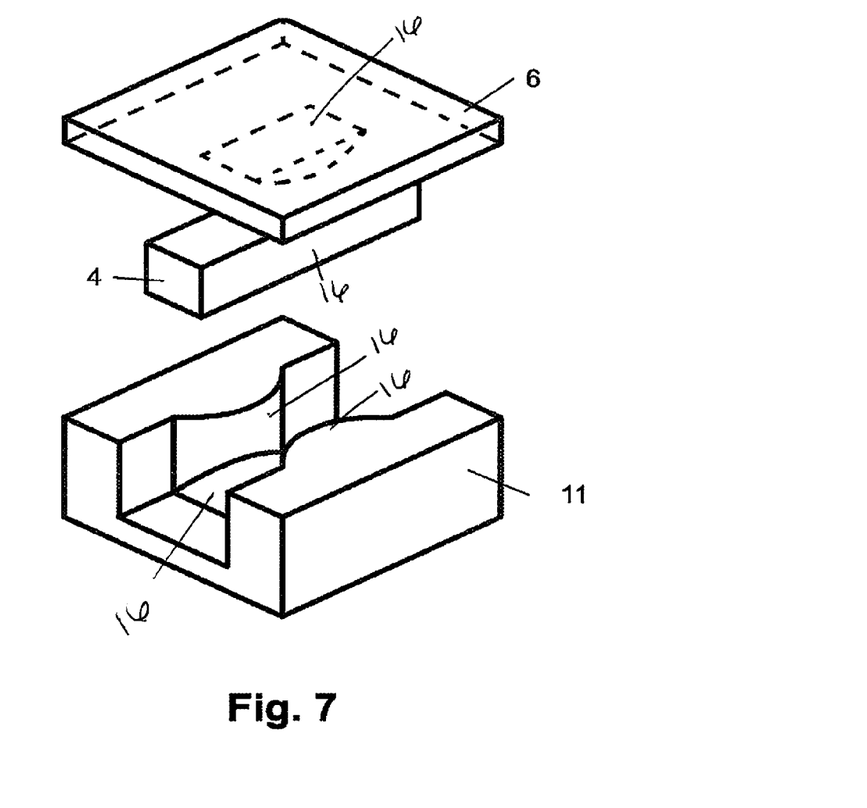
FIG. 7 shows a joint with generally cylindrical rolling surfaces with axes lying transversely on each other.

FIG. 7 shows, in greatly simplified form, a rotary joint which permits rotation about two axes of rotation. For this purpose, the bracket 6 and the optional counterholder 11 generally have cylindrical rolling surfaces 16 with axes lying transversely on each other. The guide carriage 4 again has flat rolling surfaces 16 by contrast. Such a rotary joint can therefore particularly readily compensate for the deformation of a profile rail 3. In addition, comparatively high forces can be transmitted because of the linear contact of the rolling surfaces 16.

Figure 8:
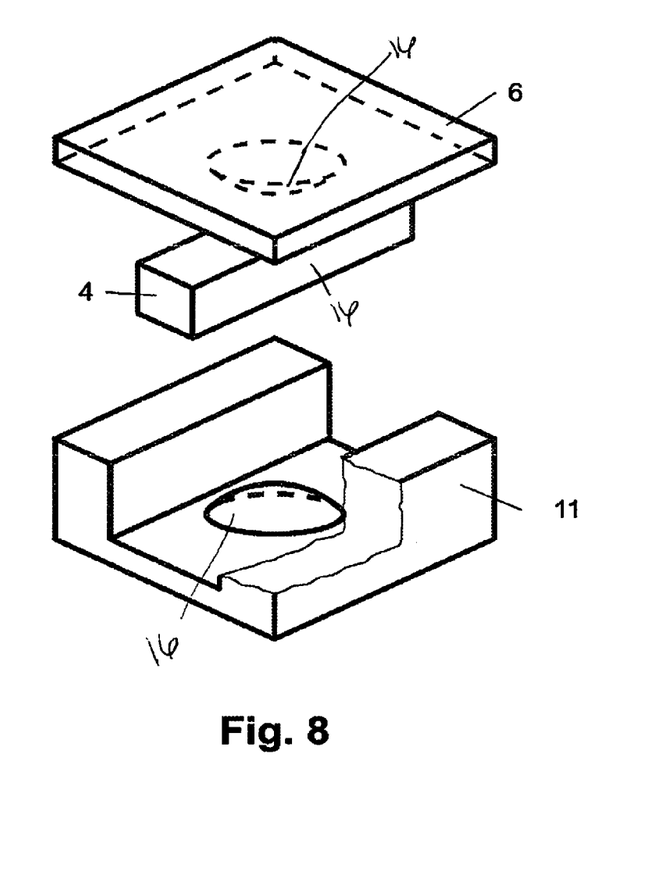
FIG. 8 shows a joint with multi-dimensionally curved rolling surfaces.

FIG. 8 shows, in highly simplified form, a rotary joint which permits rotation about any axes of rotation. For this purpose, the bracket 6 and the optional counterholder 11 have multi-dimensionally curved rolling surfaces 16, in particular spherical rolling surfaces 16. Such a rotary joint can likewise particularly readily compensate for deformation of a profile rail 3. The multi-dimensional curvature enables the rolling surfaces 16 to roll on each other upon rotation about any axis, as a result of which sliding of the rolling surfaces 16 on each other is avoided and wear thereof is therefore reduced.

By means of the provision of one rotary joint or a plurality of rotary joints, deformation of the profile rail 3 is made possible without warping the bearing between guide carriage 4 and profile rail 3. In contrast to known swinging-sliding door modules, a support 2 on which the profile rail 3 is fastened can therefore be designed to be comparatively fragile since, despite deformation of the profile rail, the swinging-sliding door (or the door leaf) continues always to run smoothly and damage in the bearing between guide carriage 4 and profile rail 3 is avoided.

In general, vertical deflections of the profile rail 3 can be compensated for by permitting rotation of the bracket 6 in relation to the profile rail 3 about an axis of rotation oriented substantially horizontally and transversely with respect to the sliding direction, horizontal deflections can be compensated for by permitting rotation about a substantially vertically oriented axis of rotation, and twisting of the profile rail can be compensated for by permitting rotation about an axis of rotation oriented substantially parallel to the sliding direction.

In general, rotations about a plurality of axes can be realized by individual rotary joints connected in series one behind another (compare FIG. 2) and/or by means of rotary joints which permit rotations about a plurality of axes (compare FIGS. 7 and 8). The rotary joints can furthermore optionally be realized by rolling surfaces rolling on each other and/or surfaces sliding in relation to each other (for example bolt/slide bush). Furthermore, the positioning of the joints as stated in the above examples is indeed advantageous, but in no way compulsory. In principle, a rotary joint can be provided in the guide carriage 4, between bracket 6 and guide carriage 4, in the bracket 6, between bracket 6 and swinging-sliding door and/or in the swinging-sliding door itself. In the latter case, for example, a mounting surface of the swinging-sliding door, to which mounting surface the bracket is fastened, can be mounted in an articulated manner about the actual door leaf.

Furthermore, it is also pointed out that the use of compensating joints is, of course, not connected to a linear rolling guide although warping of the bearing can particularly rapidly result in a damaging consequence there. The disclosed embodiments are, of course, equally applicable also to linear sliding guides of all types.

Figure 9:
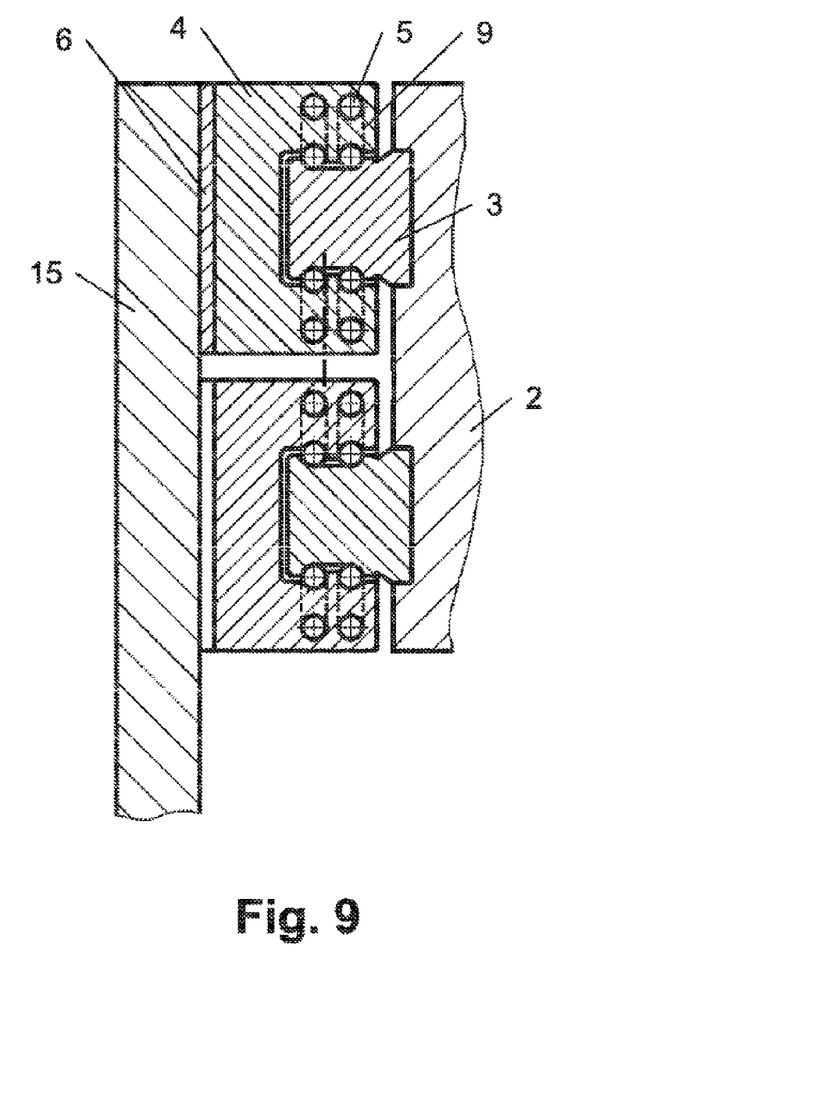
FIG. 9 shows a guide system with a vertically arranged guide carriage.

Finally, it is also noted that the use of compensating joints is, of course, not connected to the specific arrangement of the profile rails 3. On the contrary, the contact surfaces of the profile rails 3 can also be oriented vertically with respect to the support 2. FIG. 9 shows in this respect an example of a guide system, in which two swinging-sliding doors 15 are fastened via brackets 6 to the guide carriages 4 of two linear rolling guides arranged one above the other. The above-mentioned teaching is also applicable analogously to such an arrangement.

Figure 10:
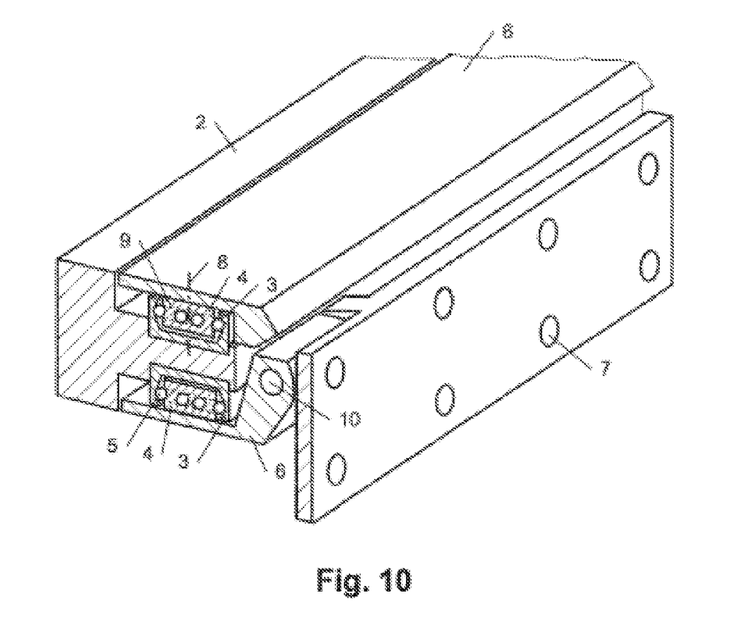
FIG. 10 shows a linear rolling guide with a C-shaped or U-shaped profile rail.

FIG. 10 shows a further example of an alternative guide system. The profile rail 3 here has a substantially C-shaped or U-shaped cross section, wherein the guide carriage 4 is mounted between the opposite end limbs of the C-shaped or U-shaped cross section. In this example, a revolving track 9 of the rolling bodies 5 is arranged in the guide carriage 4. The overall depth of the guide system can therefore be kept low. Finally, FIG. 10 also shows that the rolling bodies 5 are arranged in a single row between an end limb of the profile rail 3 and the guide carriage 4. As a result, the linear guide is particularly tolerant in relation to deformation of the guide system 1 and therefore has a particularly long service life.

Figure 11:
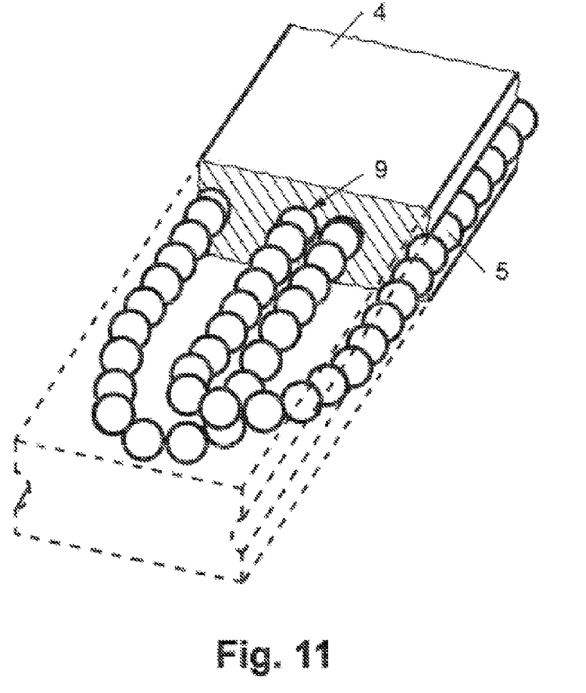
FIG. 11 shows a linear rolling guide with intersecting revolving tracks for the rolling bodies.

FIG. 11 shows an example in which the two revolving tracks 9 intersect in the end regions or reversal regions thereof. The right revolving track 9 is raised somewhat here from the revolving plane in which the revolving track 9 mostly runs, and the left revolving track 9 is lowered somewhat. As a result, a comparatively large track radius is obtained with only a small width of the guide carriage 4 and therefore only a small depth of the guide system 1. Within the context of the disclosed embodiments, because of the only small deviation from the flat shape, the revolving tracks 9 shown should be considered as "arranged substantially in one plane".

In general, a warp-resistant bearing is particularly successful if a plurality of relatively short guide carriages 4 are arranged over the course of the bracket 6, in particular if two relatively short guide carriages 4 are arranged at the ends of the bracket 6. As a result, the bearing of the guide carriages 4 continues to run smoothly even if the support 2 or the profile rail 3 is deflected to a comparatively great extent. In general, it is also possible to use only one guide carriage 4 per profile rail 3 if the tolerance inherent to the linear guide is sufficient to compensate for deformation of the support 2.

The articulated bearings of the bracket 6 that are illustrated specifically in FIGS. 5 to 8 can be realized in particular whenever the profile rail 3 is mounted only at the ends of the bracket, and therefore the bracket 6 can surround the guide carriage 4 on all sides together with the counterholder 11 (see in particular FIGS. 7 and 8). If the profile rail 3, as illustrated, for example, in FIG. 1, is intended to be connected over the entire length thereof to the support 2, it is possible, for example, for the counterholder 11 to be omitted or for the guide carriage 4 to have a corresponding extension which, in turn, can be surrounded on all sides by the bracket 6 together with the counterholder 11. In the arrangements illustrated in FIGS. 5 and 6, the extension mentioned can in particular be arranged laterally on the guide carriage 4 and, in the arrangement illustrated in FIGS. 7 and 8, can run in particular in the longitudinal direction.

The exemplary embodiments show possible variant embodiments of a guide system 1, wherein it should be mentioned here that the invention is not restricted to the specifically illustrated variant embodiments thereof; rather, various combinations of the individual variant embodiments are also possible, and this variation option, on account of the teaching relating to technical practice provided by the present invention, falls within the area of expertise of a person skilled in this technical art. The scope of protection of the patent therefore also covers all conceivable variant embodiments which are made possible by combining individual details of the variant embodiment which has been illustrated and described.

In particular, it should be stated that a guide system 1 may, in reality, also comprise more or fewer constituent parts than illustrated.

As a matter of form, it should be pointed out, in conclusion, that, to give a better understanding of the construction of the guide system 1, the latter, or the constituent parts thereof, in some cases have not been illustrated to scale and/or have been illustrated on an enlarged and/or reduced scale.

Swinging-sliding door modules of the type mentioned are known in principle. A slide slides or rolls here on the profile rail and permits displacement of the swinging-sliding door. A problem here is that deformation of a support on which the profile rail is fastened inevitably also leads to deformation of the profile rail.

Frequently occurring deformations of the support mentioned, and therefore of the profile rail, are deflections in the vertical and horizontal direction and also distortion/twisting thereof. Deflection in the vertical direction is substantially caused by the weight of the swinging-sliding door and vertical impacts/accelerations. Horizontal deflections can be caused, for example, by pressure fluctuations which arise when two trains encounter each other or during entry into and exit from a tunnel. Enormous forces, in particular in the case of high speed trains, arise because of the relatively large surfaces of the swinging-sliding doors. Distortion of the support arises in the event of an asymmetrical cross section in relation to the direction of the introduced force. Due to the complexity of the forces which occur and to the generally complex cross-sectional shape of the support and of the profile rail fastened thereon, torsion of same is virtually unavoidable.

Deflections and torsion of the support mentioned and of the profile rail fastened thereon are therefore virtually unpreventable because of the system. Since the swinging-sliding door, because of the rigidity thereof (especially in relation to vertical deflection and in relation to torsion), can only follow the deformation to a limited extent, if at all, warping occurs in the bearing between the slide and the profile rail. In particular when rolling bearings are used, bearing damage or a reduced service life of the linear guide may be the consequence.

To keep the loadings of the bearings within limits, the supports for the profile rails according to the prior art are dimensioned to be relatively stiff to keep the deformation, and therefore the warping in the bearing points, as small as possible. Of course, the weight of the swinging-sliding door module is increased as a result.

The profile rail can be deformed, with the bearing between slide and profile rail being loaded only slightly, if at all. In comparison to known swinging-sliding door modules, a support on which the profile rail is fastened can therefore be designed to be comparatively fragile since, despite deformation of the profile rail, the swinging-sliding door (or the door leaf) always continues to run smoothly and damage in the bearing between slide and profile rail is avoided. The overall weight of the rail vehicle can therefore be reduced and the driving performance thereof improved.

Vertical deflections of the profile rail can be compensated for by permitting rotation about an axis of rotation which is oriented substantially horizontally and transversely with respect to the sliding direction.

Horizontal deflections of the profile rail can be compensated for by permitting rotation about a substantially vertically oriented axis of rotation.

The rotation can be made possible here by one rotary joint or by a plurality of rotary joints. If the swinging-sliding door can rotate in relation to the profile rail about two axes lying transversely with respect to each other, a "cardanic suspension" of the swinging-sliding door can also be referred to.

In principle, a rotary joint can be provided in the slide, between bracket and slide, in the bracket, between bracket and swinging-sliding door and/or in the swinging-sliding door itself. In the latter case, for example, a mounting surface of the swinging-sliding door, to which mounting surface the bracket is fastened, can be mounted in an articulated manner about the actual door leaf.

The disclosed embodiments can also be seen in recognizing that the problem mentioned of warping in the bearing cannot be completely solved in the known manner because of the system, since deformation in the supporting elements is unavoidable, even if the elements are still designed in such a stiff manner.

At this juncture, it is noted that the features of the invention were suitable in particular for use in a swinging-sliding door or in a swinging-sliding module. Nevertheless, the invention can also be used for a sliding door or a sliding door module in which a swinging mechanism is missing.

Further advantageous refinements and developments of the invention emerge from the dependent claims and from the description in conjunction with the figures.

It is advantageous if the at least one rotary joint also permits rotation of the swinging-sliding door in relation to the profile rail about an axis of rotation oriented substantially parallel to the sliding direction. By permitting this rotation, twisting of the profile rail can be compensated for.

It is advantageous if the at least one rotary joint is formed by a pin rotating in a bearing shell or in a rolling bearing. The rotary joint in this case is therefore formed by a plain bearing or a rolling bearing permitting rotation of a pin mounted in the bearing. The rotary joint can thereby be realized by easily available means.

It is advantageous if the at least one rotary joint is formed by two rolling surfaces rolling on each other. For this purpose, one of the two rolling surfaces is formed convexly, and the other rolling surface is formed concavely with an identical or smaller curvature, or is formed flat or likewise convexly.

It is particularly advantageous if one rolling surface has a generally cylindrical, in particular circular cylindrical, shape. Rotation about an axis of rotation is thereby made possible. In addition, comparatively high forces can be transmitted because of the linear contact between the rolling surfaces.

LIST OF REFERENCE NUMBERS

1 Guide system
2 Support
3 Profile rail
4 Guide carriage
5 Rolling bodies
6 Bracket
7 Fastening holes
8 Axis through the center of gravity of the profile rail
9 Revolving track of the rolling bodies
10 Pin
11 Counterholder
12 Alignment pin
13 Screw
14 Rubber buffer
15 Swinging-sliding door
16. Rolling surface

The invention claimed is:

1. A swinging-sliding door module for a rail vehicle, the swinging-sliding door module comprising:
at least one swinging-sliding door;
a linear guide with a profile rail oriented in a sliding direction of the swinging-sliding door mounted to extend along the surface of a support, and a slide which is mounted displaceably on said profile rail;
a bracket or a plurality of brackets for fastening the swinging-sliding door, which bracket or brackets is/are connected to the at least one slide; and
at least one rotary joint which permits rotation of the swinging-sliding door in relation to the profile rail about axes of rotation oriented substantially horizontally and transversely with respect to the sliding direction or an axis of rotation oriented substantially vertically;
wherein the at least one rotary joint is formed by two rolling surfaces contacting each other and rotatably movable relative to each other;

wherein one of the rolling surfaces is a surface of the bracket.

2. The swinging-sliding door module of claim 1, wherein the at least one rotary joint also permits rotation of the swinging-sliding door in relation to the profile rail about an axis of rotation oriented substantially parallel to the sliding direction.

3. The swinging-sliding door module of claim 1, wherein the at least one rotary joint is formed by a pin rotating in a bearing shell or in a rolling bearing.

4. The swinging-sliding door module of claim 1, wherein one rolling surface has a generally cylindrical shape.

5. The swinging-sliding door module of claim 4, further comprising two generally cylindrical rolling surfaces with axes lying transversely to the one rolling surface having a generally cylindrical shape.

6. The swinging-sliding door module of claim 1, wherein one rolling surface is curved spherically.

7. The swinging-sliding door module of claim 1, wherein a weight of the swinging-sliding door presses the two rolling surfaces against each other.

8. The swinging-sliding door module of claim 7, wherein a convex rolling surface of the bracket is pressed by the weight of the swinging-sliding door onto a horizontally oriented, flat rolling surface of the slide.

9. The swinging-sliding door module of claim 1, wherein the two rolling surfaces are secured against lifting with the aid of a counterholder.

10. The swinging-sliding door module of claim 9, wherein the counterholder presses the rolling surfaces against each other with the aid of spring force or by elastic deformation.

11. The swinging-sliding door module of claim 1, wherein the linear guide is a linear rolling guide, and the slide is a guide carriage which is mounted on the profile rail by revolving rolling bodies.

12. The swinging-sliding door module of claim 11, wherein the profile rail is fastened on, or is surrounded by, a support which is oriented in the sliding direction of the swinging-sliding door, wherein a contact surface of the profile rail with the support is oriented substantially horizontally.

13. A rail vehicle having at least one swinging-sliding door module as claimed in claim 1.

* * * * *